June 30, 1964  W. DEMANT ETAL  3,139,483
TELEPRINTER APPARATUS
Filed Dec. 23, 1959  15 Sheets-Sheet 1

Inventors
WALTER DEMANT
EUGEN HILDINGER
By Toulmin & Toulmin
Attorneys

June 30, 1964   W. DEMANT ETAL   3,139,483
TELEPRINTER APPARATUS
Filed Dec. 23, 1959   15 Sheets-Sheet 4

Inventors
WALTER DEMANT
EUGEN HILDINGER
By Toulmin & Toulmin
Attorneys

June 30, 1964 W. DEMANT ETAL 3,139,483
TELEPRINTER APPARATUS
Filed Dec. 23, 1959 15 Sheets-Sheet 10
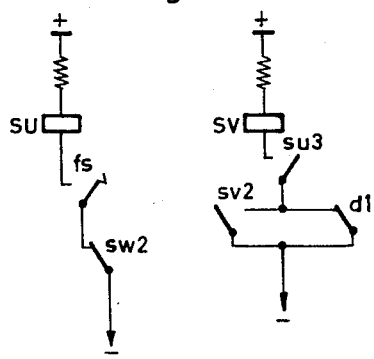
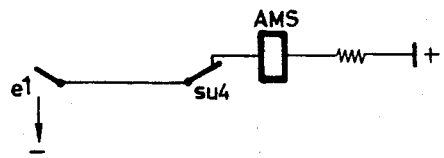
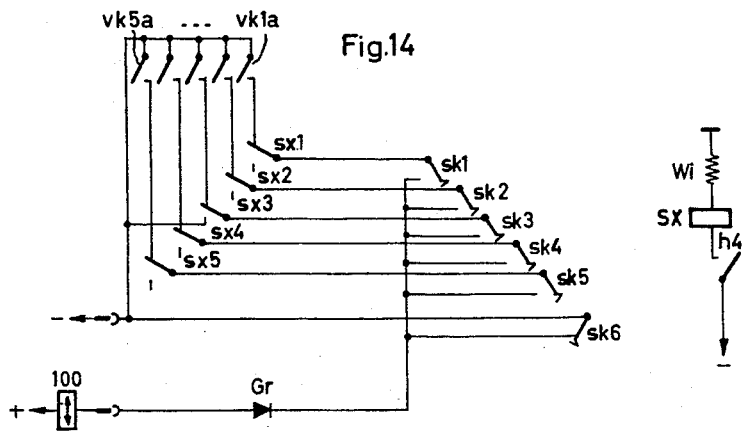
Inventors
WALTER DEMANT
EUGEN HILDINGER
By Toulmin & Toulmin
Attorneys

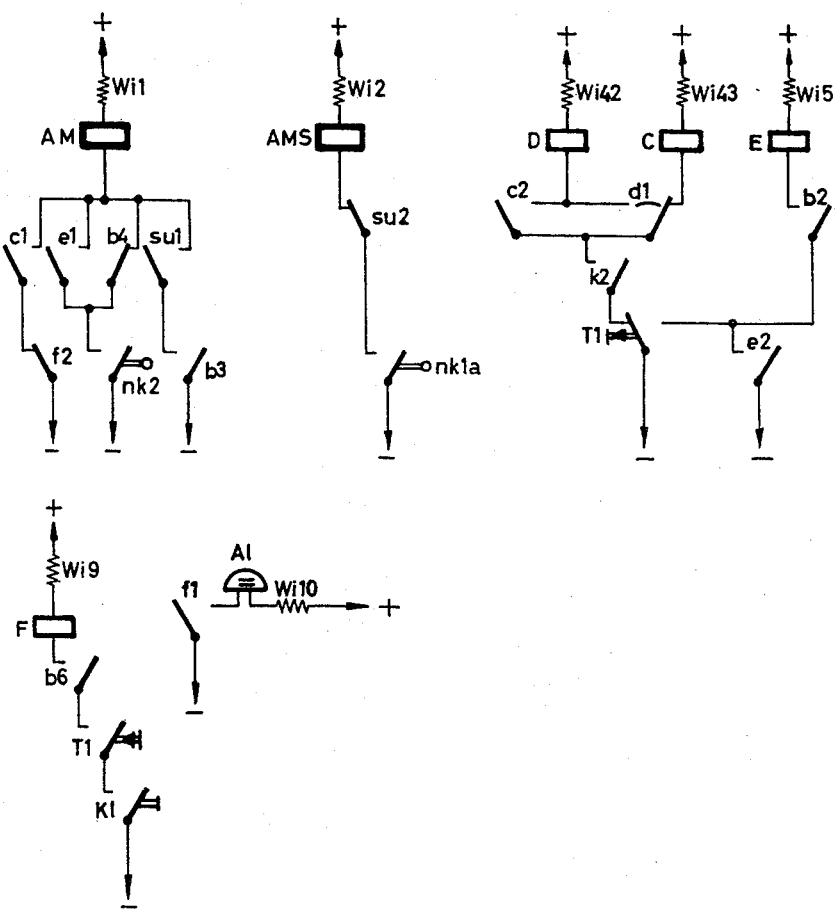

June 30, 1964  W. DEMANT ETAL  3,139,483
TELEPRINTER APPARATUS
Filed Dec. 23, 1959

Inventors
WALTER DEMANT
EUGEN HILDINGER
By Toulmin & Toulmin
Attorneys

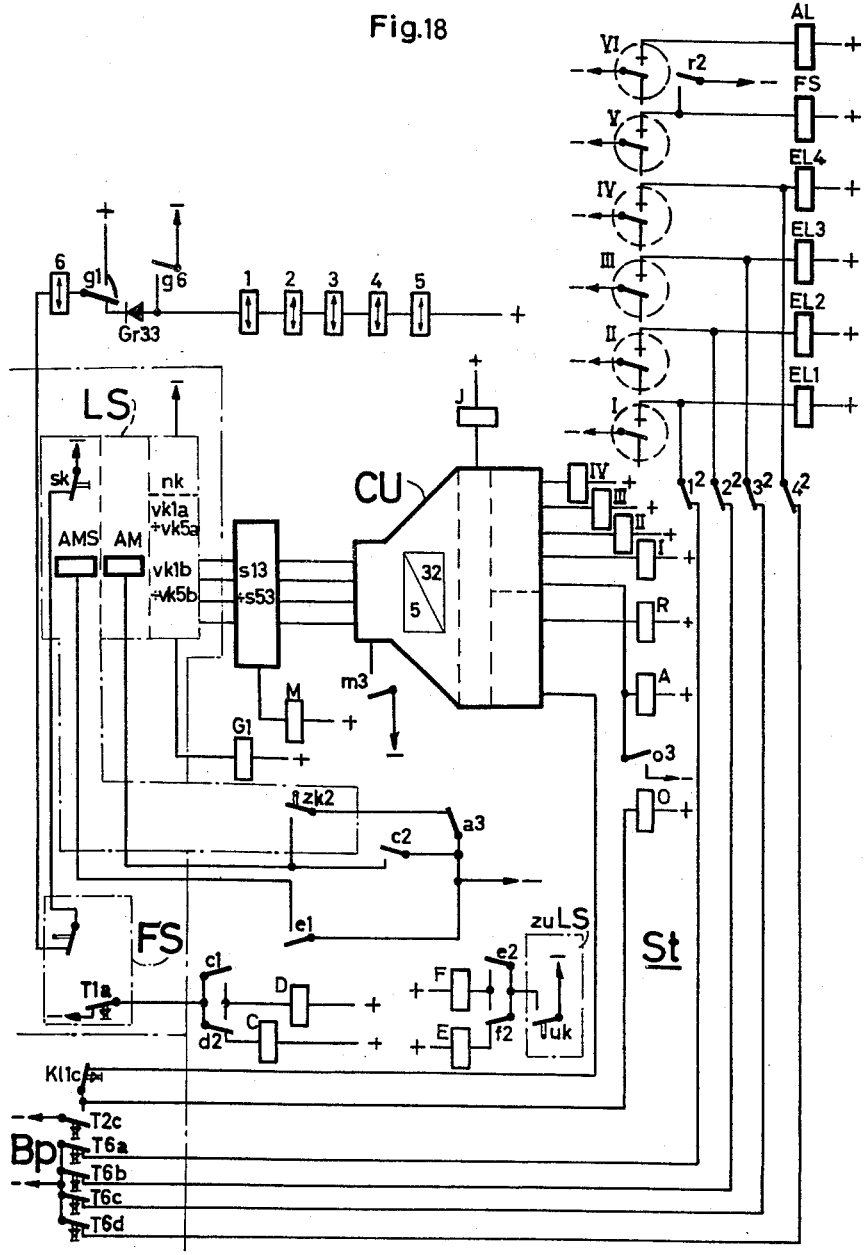

United States Patent Office 3,139,483
Patented June 30, 1964

3,139,483
TELEPRINTER APPARATUS
Walter Demant and Eugen Hildinger, Munich, Germany, assignors to Siemens & Halske Aktiengesellschaft, Berlin, Germany, a company of Germany
Filed Dec. 23, 1959, Ser. No. 861,626
Claims priority, application Germany Dec. 30, 1958
15 Claims. (Cl. 178—4)

This invention relates to teleprinter apparatus and in particular to apparatus wherein a selected portion of the teleprinter signal or information is passed only to a selected receiver or receivers.

The object of the invention is to provide information routing apparatus comprising a plurality of teleprinter receiving devices and control means for controlling the flow of information to a selected number of receiving devices.

Such apparatus has previously been used wherein a central distributor has parts permanently tuned to a portion of the information, for example to a sequence of teleprinter signals representing the fixed address or location of the selected receiver. This is, of course, a disadvantage as the necessity for permanent tuning restricts the flexibility of the apparatus.

It is an object of the present invention to provide teleprinter apparatus in which this disadvantage is obviated.

Accordingly, the present invention consists in information-routing apparatus comprising a plurality of teleprinter receiving devices, control means, means for supplying a routing signal to said control means, and means for causing the control means, in response to the routing signal, to pass the information to a selected number of said teleprinter receiving devices, said number including one.

The invention also consists in information-routing apparatus including a plurality of teleprinter receiving devices, control means, means for supplying teleprinter information and at least one routing teleprinter signal to said control means, and means for allocating said routing signal to a selected number of receiving devices said control means being responsive to said routing signal to cause the said portion of said information to be routed to said selected number of said receiving devices.

The invention also consists in information-routing apparatus including a plurality of teleprinter receiving devices, control means, means for supplying teleprinter information and a number of routing teleprinter signals to said control means each one of said routing signals being associated with a separate portion of the information, and means for allocating each routing signal to a respective selected number of said receiving devices, said control means being responsive to each routing signal to route the associated portion of said information to the respective selected number of receiving devices.

The invention is generally applicable to use in production control, in newspaper offices, and in an industrial installation. In an industrial installation it may be used to distribute selected parts of the information contained on an order card to the accounts department, stores department, and factory. The distribution may be controlled from a central control position and if the information contained on the card is to be transferred to teleprinter tape for subsequent feeding to a tape reader, then programme instructions for the routing of the information and for the control of the final receiving devices can be inserted on the tape.

The installation may include a key-controlled teleprinter machine connected electrically to a punched tape transmitter, to a control device, and to a receiving punch which punches into the tape the programme instructions and also the information to be routed. The apparatus would then also include one or more receiving devices to receive only the routed information and programme instructions for the control of the receiving device. The receiving devices may be, for example, sheet teleprinters, punch tape or card punches. By using a central code converter or a local converter, one receiving device may operate according to one teleprinter code system, while another receiving device may be operated according to another system.

It is then possible to insert the distribution programme in a programme punched tape once only, thus reducing the number of manual operations which may be necessary to set up the apparatus.

The programme punched tape used may contain, in addition to programme characteristics and possibly message or information parts, functional teleprinter signals such as an interval signal, carriage return and line advance signals, in order to achieve an individual control of the individual receiving machines so that the received information is printed in the right column on the form. If receiving punches are used and their punched tapes are to later control form printing machines locally or through a teleprinter line, the data on these punched tapes are adjusted to these conditions by added carriage return signals and other instruction signals.

If a punched tape obtained from a receiver punch is used, e.g., for the processing of data in other instruments it is important that the message information is contained in the punched tape and also instructions to ensure that the correct spaces are provided for the various headings on the form so that in the final form prepared by a form teleprinting receiver the number of the spaces for characters in each line and the sequence of the columns is the same as in the original form. This is necessary since any operational error would cause a step group to be created, for example, in the punched tape the information would not be punched correctly.

In order to facilitate filling in a form a key-controlled teleprinter, a programme punched tape transmitter, a control device, and a number of teleprinter receivers may be provided. A programme punched tape may be constructed as a test punched tape for the number of the teleprinter signals allocated to written signs which are to be keyed between the programme characteristics, and switching means may be provided in order to transport the programme punched tape step by step forward, when teleprinter information is keyed-in through the teleprinter machine keyboard, and to stop teleprinter signals being keyed-in through this keyboard when the next programme characteristic is reached. The test and control punched tape is therefore constructed so that in addition to the programme characteristics it contains suitably chosen step groups, the number of which always corresponds to the written signs to be typed.

One embodiment of the invention will now be described by way of example, with reference to the accompanying drawings in which:

FIGURE 10 is a diagrammatic representation of a universal system incorporating the circuits shown in FIGURES 2 to 7, FIGURES 11 to 16 are circuit diagrams illustrating modifications according to the invention.

FIGURE 18 shows a circuit diagram of an embodiment of the invention.

The circuit arrangement is shown in FIGURE 10 and includes a control device $St$ with a control desk $Bp$, which is provided with some push buttons and manually controlled key switches as well as with plugs for the purpose of allocating routing signals. A punched-tape transmitter LS of the step transmitter type with a distributor is provided, a key operated teleprinter machine FS for writing and receiving texts, a receiving punch AL which may be called "punch-all" because it punches all characteristic signals and text signals, four receiving punches EL1, EL2, EL3 and EL4, which punch the received teleprinter signals.

The control device contains a large number of relays, rectifiers $Gr$ and resistors $Wi$, the denotation and significance of which will be understood from the following description.

Figure 3:
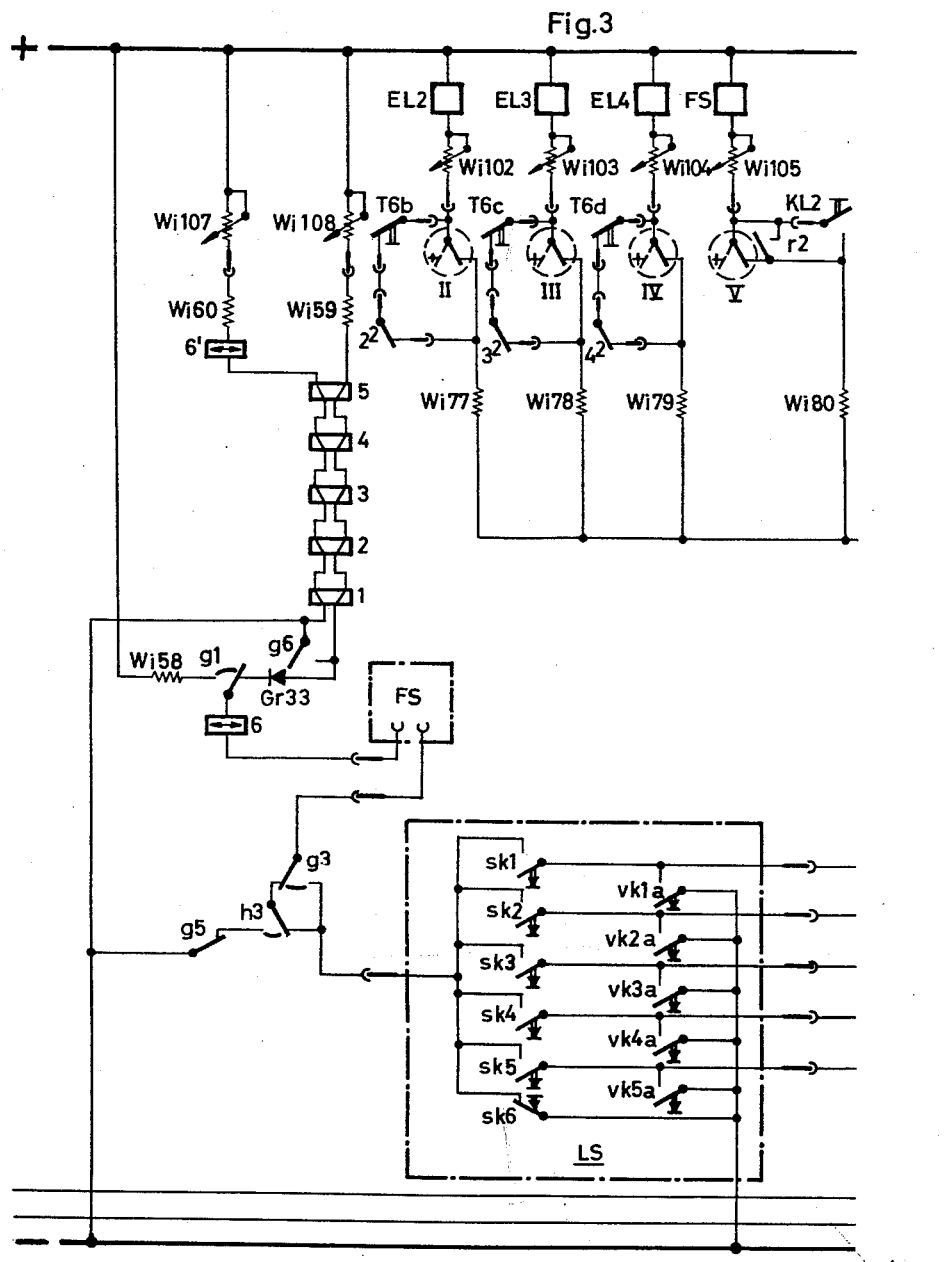

It will be assumed that a form is present in the teleprinter machine FS and has to be filled in. Also that a part of the information content of this form is to be supplied to all the receiver punches EL1 to EL4, a part to one of them only and another part to two of them only. The punching processes in the individual receiving punches are to follow each other without gaps and the sequence of the receiver controls for the various message parts may be arbitrary. A so-called characteristic punch tape is therefore first produced and into this are punches, e.g., the following symbols: $Bu$, $Wr$, $ZL$, the routing combination "32" and A, the routing combination of "32" and B, the routing combination "32" and C. This characteristic punched tape is put in the punched tape transmitter LS and contains in addition to the programme characteristic for the selection process, also those combinations which direct the carriage of the teleprinter to the start of the columns of the form (e.g., WR, ZL, $Zwr$). As long as the tape is correctly inserted a paper contact PK (FIGURE 3) and a flap contact $KlK1$ are open and $KlK2$ are closed. In FIGURE 3 the contact PK is drawn closed; in this case it is assumed that the flap of the punched tape transmitter is closed but that no paper is inserted.

For the purpose of preparing the control apparatus at the punched tape transmitter for operation, the three-pole key T3 is depressed (FIGURES 2 to 7); thereby the feed current circuit, which is already open, for the whole apparatus including the motors for the teleprinter instruments is interrupted (through $T3c$, not shown) while the key is depressed. A relay K (FIGURE 2) is also excited through the contact $T3b$ of this key and a resistor $Wi41$. The relay K is kept in an energized state through one of its contacts K1 and a key controlled switch $T4a$ which is closed in the rest state. A potential is therefore applied at various points in the circuit. A release magnet AM (FIGURE 3) for the punched tape advance- and scanning-device in the punched tape transmitter LS is connected through a resistor $Wi61$, a rest contact $p3$, a working contact $c2$, a working contact $k6$ and a rest contact $T3a$ of the key T3 in series with the voltage source (this circuit will be labeled as current circuit 1). This current circuit is therefore opened while the key T3 is depressed. Through the contact $k2$ a relay C (FIGURE 2) is energized through the current circuit:

(2)  $-, T1a, \dfrac{T2b}{K11d}, k2, d2, C, Wi43, +$

The relay C causes a relay D (FIGURE 2) to operate and in its energisation causes $d2$ to change over and the current circuit for relay D becomes:

(2a)  $c1, D, Wi42$ to $+$

The relay D is held-on through the changeover contact $d2$ and simultaneously relay C is de-energised. In this way the relay C always delivers a short pulse for corresponding switching functions. In order that a pulse does not reach the release magnet AM (FIGURE 3) when the installation is switched on, a so-called rest contact $T3a$ of a key T3 is situated in this current circuit. Since this key is still depressed when the contacts $c2$ and $k6$ are closed, such a pulse which would release the magnet AM cannot therefore be generated immediately after switching on. With the excitation of the relay K (FIGURE 2) the construction of the current circuit for the apparatus including the motors is prepared. It is closed at once as soon as the key T3 is released.

Figure 7:
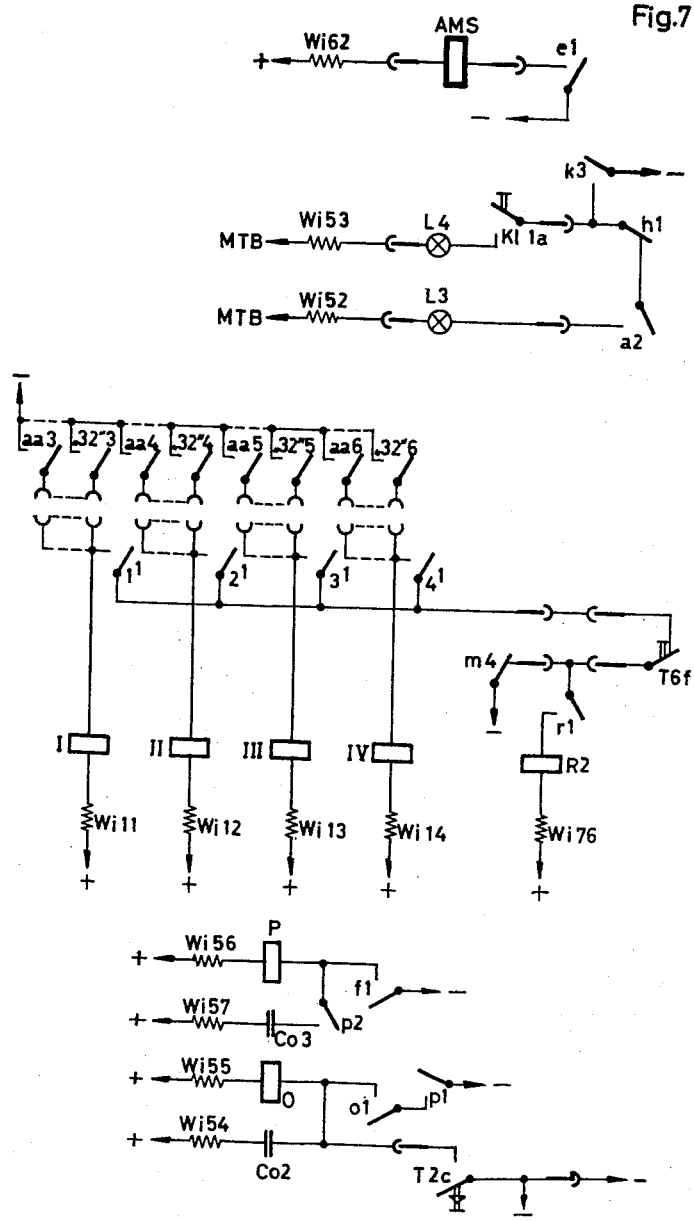

In order to put the control device and the programme punched tape transmitter into operation a starter key T1 is depressed. Thereby the relay D (FIGURE 2) is energised through the rest contact $T1a$ which is the current circuit (2a) for the relay D. Through the contact $d2$ the current circuit (2), including the relay C is again prepared. After the key T1 has been released the relay C attracts its armature and closes the current circuit (1) which has been prepared by the contact $k6$. Simultaneously, however, the current circuit (2a) is closed again through a contact $c1$ and the relay C is energised again through the contact $d2$ and therefore only one current pulse is supplied to the release magnet AM (FIGURE 3). Sensing levers in the punched tape transmitter scan the inserted punched tape and close, the contacts $vk1$ to $vk5$ in the punched tape transmitter, for example, when the punch combination $Bu$ is present. A contact $uk$ (FIGURE 3) is controlled by the advance control shaft of the punched tape transmitter which shaft makes one rotation per teleprinter signal, as will be seen from FIGURE 8. When this contact is closed a relay E is energised through (3)  $-, uk, f2, E, Wi44, +$ In this way the contact $e1$ in the feed current circuit of a release magnet AMS (FIGURE 7) is closed for the rotating transmitting distributor which is driven by the same motor. The transmitting distributor includes the contacts SK1–SK6 (FIGURE 4) and the magnet AMS (FIGURE 7). Simultaneously relay F is excited through the circuit (3a)  $-, uk, e2, F, Wi45, +$ and co-operates with the relay E in the same way that the relay C co-operates with the relay D. Therefore only one pulse, sufficient for triggering it off, reaches the magnet AMS. The feeder relays S1 to S5 (FIGURE 4) are excited each through one of the resistors $Wi1$ to $Wi5$ and each through one of the preparing transmitter contacts $vk1a$ to $vk5a$ which are all closed in this case. The contacts $s11$, $s21$, $s31$, $s41$ and $s51$ (FIGURE 4) and also contacts $s12$, $s22$, $s32$, $s42$, $s52$ (FIGURE 5) are closed, whereas the contacts $s13$, $s23$, $s33$, $s43$, $s53$ (FIGURE 2) are opened. The associated current circuits will be explained later.

In the rhythm of the successive openings of the distributor contact $sk6$ (FIGURE 4) and closing of the distributing contact $sk1$ to $sk6$ (FIGURE 4) the telegraphy steps including starting and blocking step are transmitted through (4)  $-, vk1a, sk1$ or $vk2a, sk2 \ldots$ or $sk6, h3, g3$, the transmitting contact of the teleprinter machine FS, work winding of the relay 6, $g1$, $Gr33$, work windings of the relays 1 to 5, $Wi59$, $wi103$, $+$ or, after the opening of contacts $vk1a$ to $vk5a$, for the duration of the non-excitation of a relay N to be discussed later, through the circuit (4a)  $-, n4,$ $\begin{array}{l} Gr11, S11, sk1, \\ \overline{Gr12, s21, sk2,} \\ Gr13, s31, sk3, \\ \overline{Gr14, s41, sk3,} \\ \overline{Gr15, s51, sk5} \end{array}$ $h3 \ldots$ In this case the relays S1 ... S5 hold on through $s11 \ldots s51$ (FIGURE 4) in as far as they were excited.

Figure 8:
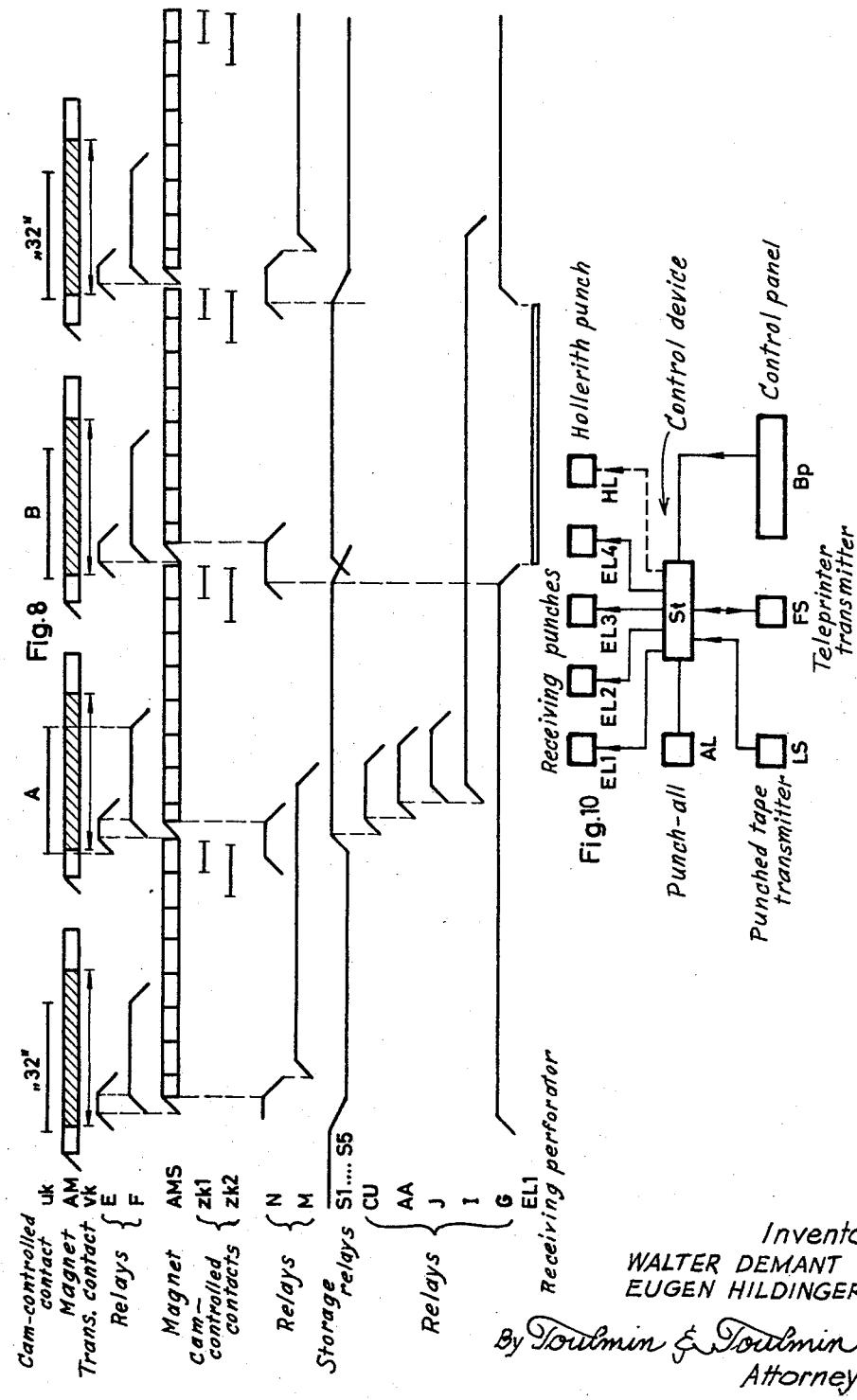
FIGURE 8 is a graphical representation of the operation in time of various parts of the circuits shown in FIGURES 2 to 7.

The telegraphy steps are applied simultaneously to the transmitting relays 1 to 6 (FIGURE 4) which are allocated to the individual receiving punches or teleprinter machines; these are therefore excited or not excited depending on the type of step. This teleprinter signal is however only applied through the contact V (FIGURE 6) to the receiver of the transmitting teleprinter machine FS and through the contact V1 (FIGURE 6) to the punch-all AL since the transmission contacts I, II, III, IV (FIGURE 6) associated with the transmitting relays 1, 2, 3 and 4 (FIGURE 4) are short circuited. The keyboard of the teleprinter machine FS can, for example, be blocked electromagnetically by means of a contact which is controllable by the relay P. As can be seen from FIGURE 8 two contacts $zk1$, $zk2$ (FIGURE 3) are controllable from the distributor shaft and the contact $zk2$ is capable of exciting the magnet AM (FIGURE 3) again through (1a) $\quad -, zk2, a3, AM, Wi61, +$ This interaction between the release of the advance- and scanning-shaft by the magnet AM and the release of the distributor shaft by the magnet AMS is repeated until a characteristic combination formed by the combination "32" is scanned in the characteristic punched tape; but it becomes effective only after the teleprinter signal following the combination "32." In the example illustrated in FIGURE 1 it occurs after the signals B$u$, WR, Z1 have been scanned. It may be added at this point that the contact $zk1$ (FIGURE 3) which is controlled by the distributor shaft once during each rotation as indicated in FIGURE 8 excites a winding N1 (FIGURE 3) of a relay N through the circuit:

(5) $\quad -, zk1, N1, Wi22, +$

With the excitation of the relay N not only are the relays 1 to 6 (FIGURE 4) separated during the current steps under certain circumstances from the negative terminal through the contact $n4$ (FIGURE 4), but when the combination "32" occurs the relay M is also excited. This occurs because "32" is represented on the paper tape by the absence of punched holes and this causes contacts V$k1a$–V$k5a$ to remain open, S1–S5 to be de-energised causing S13–S53 to remain closed and relay M to be energised through the circuit:

(6) $\quad -, k4, n3, s13, s23, s33, s43, s53, M, Wi19, +$

Figure 2:
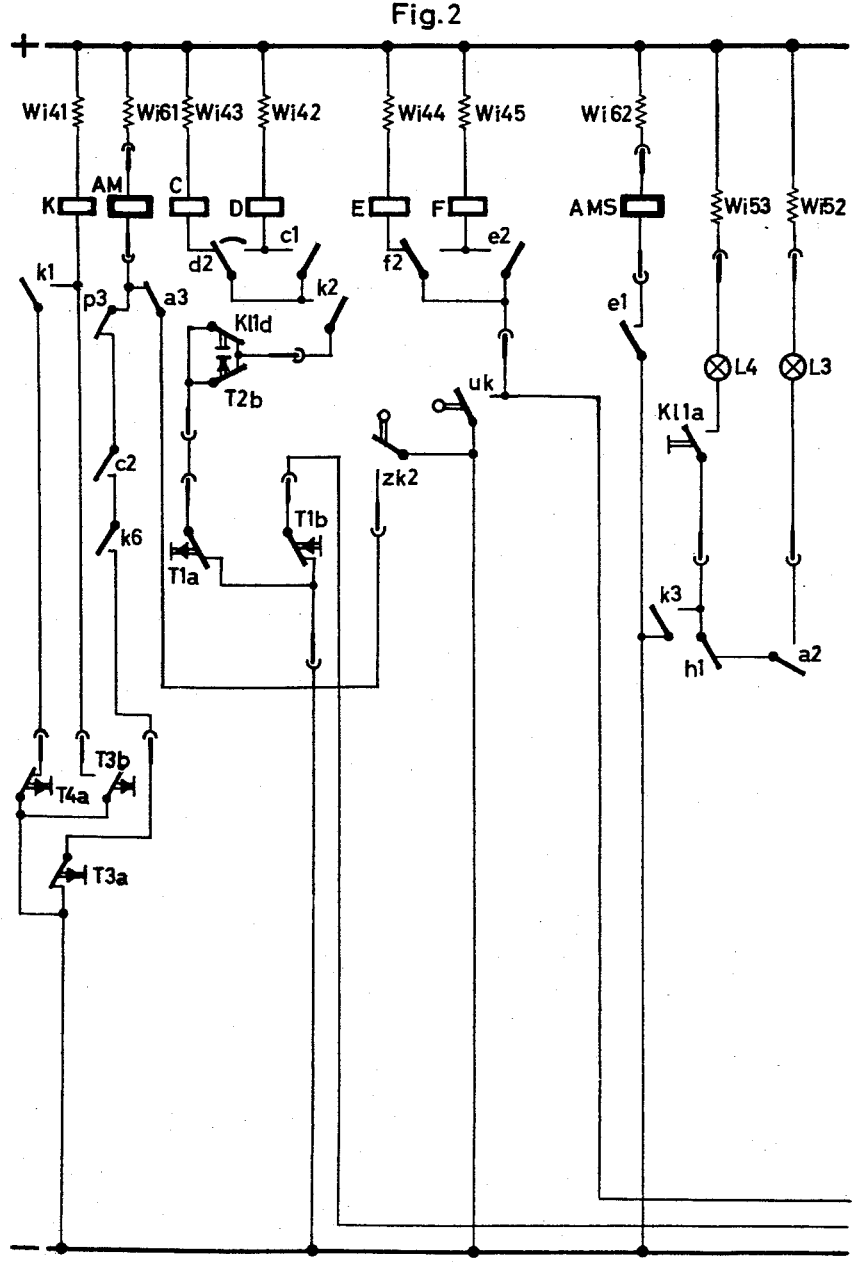

In this case the relay N is held on through the circuit:

(7) $\quad -, f3, n1, N2, Wi21, +$ (FIGURE 2)

and the relay M (FIGURE 2) is held on through (8) $\quad -, j, m1, M, Wi19, +$

In this way the relays CU1 to CU9 (FIGURE 5) and the associated contact pyramid $cu11$ to $cu93$ with up to 32 characteristic control relays of a relay code converter are connected through a contact $m3$ to the negative pole of the voltage supply. When the next teleprinter signal arrives this signal can now be evaluated as a characteristic routing signal. This occurs in a similar manner for all characteristic route control relays. These relays are associated with those teleprinter signals which correspond to the alphabetic letters A to Z and are therefore denoted with AA to ZZ in order to distinguish them from the characteristic control relays which are used for other purposes. In each case a plurality of contacts $aa1$, $aa2$, $aa3$, $aa4$, $aa5$, $aa6$ up to $zz6$ is controllable. Let it be asumed that relays I to IV (FIGURE 6) with contacts $1^1$, $1^2$ up to $4^1$, $4^2$ serve for making the transmission contacts I to IV in the receiving circuit of the receiving punches EL1 to EL4 (FIGURE 10) effective. In this manner it is possible to allocate to the receiving punch EL1 the characteristic letters A, B and C by connecting the relay 1 (FIGURE 7) through plugs (forming part of a selector distributor) to the contacts $aa3$, $bb3$, $cc3$ and to the receiving punch EL2, the characteristics letters A and C, by connecting the relay II to the contacts $aa4$ and $cc4$ whereas the receiving punches EL3 and EL4 are to receive at first no message portions. Simultaneously with the excitation of any one of the relays AA to ZZ, which occurs immediately after the combination "32" the relay J (FIGURE 2) is excited by closing the current path (9) $\quad -, aa1 \ldots pp1, Gr31, Gr32, J, Wi46, +$ or the path (9a) $\quad -, qq1 \ldots vv1, \dfrac{Gr22, Gr32, J, Wi46,}{R1, Wi75} +$ or the path (9b) $\quad -, ww1 \ldots zz1, J, Wi46, +$ through one of the contacts $aa1$ to $zz1$. The contact $j$ of this relay interrupts the current circuit (8) for the relay M (FIGURE 2). The relay code converter is therefore switched off again. Simultaneously a relay G is energised through the circuit:

(10) $\quad -, uk, vk1b \ldots vk5b, G1, Wi48, +$ (FIGURE 3)

when the combination "32" occurs and this relay is held on through the circuit:

(11) $\quad -, K1K2, \dfrac{n2}{m2}, g2, G2, Wi49, +$

While the relay G is energised continuous current is applied through contact $g6$ to the work winding of relays 1 to 5 (FIGURE 4) whereas the positive pole of the current source is connected to the work winding of relay 6 through the changeover contact $g1$ and a resistor $Wi58$. The relays 1 to 6 are also provided with counter windings for electrical resetting; the one for the relay 6 is denoted by 6' and is illustrated separately in the FIGURE 4. The significance of contacts $g3$, $g4$, $g5$, which are effective only in special cases will be explained later. As has been explained the relay M is de-energised after the current circuit (9) has been established. Therefore relay G is again de-energised after the relay N has operated. This occurs towards the end of the passage of the characteristic routing letter (e.g., A) through the distributor and the resulting closing of the contact $zk1$ (current circuit 5). The relay N remains energised during the standing-still period of the punched tape transmitter LS. Since the characteristic letter A causes the contact $aa1$ to close not only is the relay J (FIGURE 2) excited through the current circuit (9) but also the relay A through the circuit:

(12) $\quad -, aa1, K11c, A, Wi47, +$

This relay remains energised through the circuit:

(12a) $\quad -, T1b, Gr41, a1, A, Wi47, +$

This ensures that the current circuit (1a) for the release magnet AM (FIGURE 3) is interrupted through the contact $a3$ when the contact $zk2$ is finally closed and the punched tape transmitter which is reading the characteristic routing punched tape comes to rest. It must be stressed that the routing combination "32" and the characteristic routing letter are transmitted only through the transmission contact VI (FIGURE 2) and this is controlled by the relay 6. The contact VI is, of course, associated with the punch-all AL.

Figure 1:
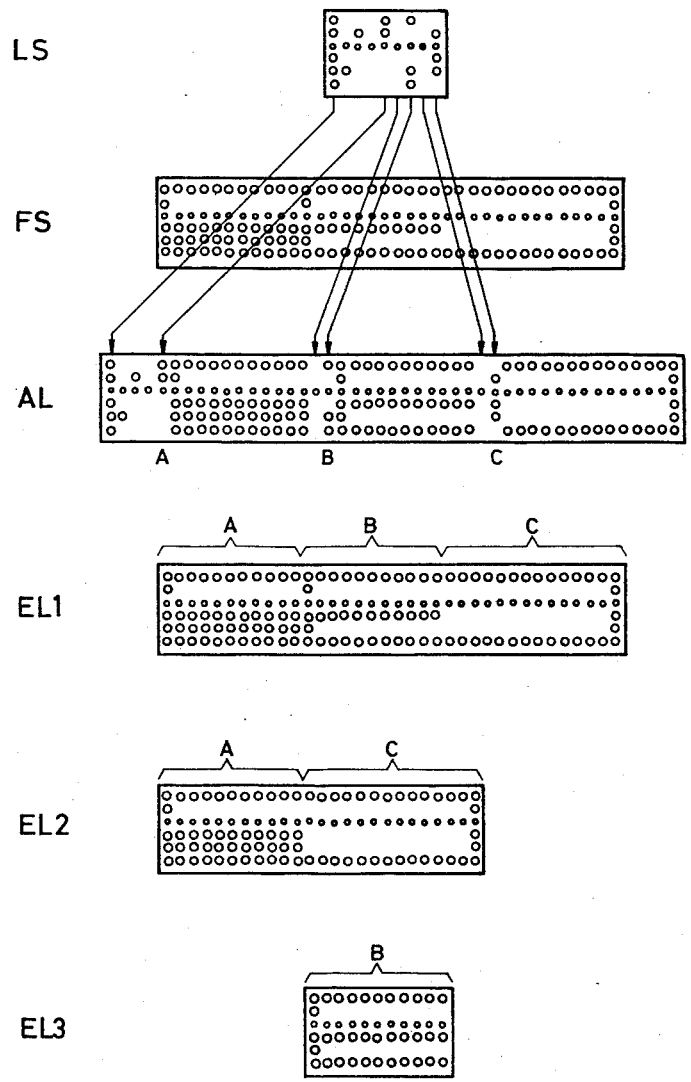
FIGURE 1 shows punched teleprinter tape incorporating some examples of programme and message parts to be routed, FIGURES 2, 3, 4, 5, 6 and 7 together show the main circuits for a complete usable installation according to the invention.

The teleprinter signals which are now to be transmitted by the teleprinter machine FS (FIGURE 10) by the operation of its keyboard can now be applied to the receiving punch EL1 (after the opening of the contact $1^2$ (FIGURE 3) which is controlled by the relay I) through the transmission relay contact I, to the receiving punch EL2 (after opening of the contact $2^2$ (FIGURE 6) controllable by the relay II) through the transmission relay contact II, to the receiver of the teleprinter machine FS through the transmission relay contact V (FIGURE 6), and to the punch-all AL through the transmission relay contact VI (FIGURE 6) assuming as stated above that the relays I and II are energised through the contacts $aa3$ and $aa4$ respectively. The relays I and II hold on for the duration of non-excitation of relay M (FIGURE 2), and therefore for the duration of the feeding-in of an information text by hand, through their hold-on contacts $1^1$ and $2^1$ respectively and the key contact $T6f$ as well as the relay contact $m4$ (FIGURE 7). If the text has been punched in by means of the teleprinter keyboard up to the end of the portion to be supplied to a selected number of a plurality of receiving pulses the key T1 is depressed again. Apart from the energisation of relay D (FIGURE 2), by the opening of current circuit $2a$, the current circuit ($12a$) for the energisation of relay A is thus interrupted. The next routing characteristic can now be accepted by the characteristic punched tape. Let it consist of the signal combination "32" and of the signal combination allocated to the letter B. If now a connecting plug is introduced between the relay contact $bb3$ and the relay I (FIGURE 7) and between $bb5$ and relay III respectively but not between $bb4$ and relay II and not between $bb6$ and relay IV, the portion of the text which is to be fed in now is transmitted automatically without gaps to the receiving punches EL1 and EL3 (FIGURE 10) and obviously to the punch-all AL and the teleprinter machine FS but not to the receiving punches EL2 and EL4. In a similar manner the text following the characteristic routing combination "32" and C may be accepted by the variably connectable receiving punches EL1 and EL2 when a connection between the contact $cc3$ and the relay I as well as between $cc4$ and the relay II is plugged. In FIGURE 1 the punched teleprinter tape corresponding to these combinations is shown.

Alternatively it is possible to use in the punched tape transmitter LS the punched tape which is produced in the punch-all AL and which contains routing and instruction characteristics as well as the information text and to cause certain text portions to be automatically routed to selected predetermined receivers which vary through the whole text in their number and combination for each routing.

The manner of working of the punched tape transmitter LS is initially the same as in the first example; however the key K11 is operated and a connecting plug is not inserted between any of the contacts $aa2$ ... "32" 2 and the relay A. Under this condition the relay A cannot respond when a teleprinter signal which corresponds to a characteristic routing letter passes through. Admittedly the relay J (FIGURE 2) is correspondingly excited through the current circuit (9) or ($9a$) or ($9b$) respectively and the relay M is switched off again through the current circuit (8) and the short circuits of predetermined transmission relay contacts (FIGURE 6) made by the relay I to IV (FIGURE 7) remain. However the interaction between the magnets M and AMS is not inerrupted and the punched tape transmitter therefore carries on. In this case the hold-on circuits for the relays S1 to S5 (FIGURE 4) are interrupted by the contact $n4$ after each teleprinter signal has been transmitted. Every time a combination "32" is scanned the hold-on circuits for the relays I to IV are interrupted again through contact $m4$ (FIGURE 7). In this way the previous programming is deleted by the characteristic routing combination which precedes the information.

If the transmission originating from the punched tape transmitter is to be interrupted, the stop key T2 is depressed. In this way the current circuits (2) and ($2a$) for the relays C and D are interrupted since, as mentioned, the key K11 is operated and therefore the contact $k11d$ (FIGURE 3) is opened. Moreover a current circuit for a relay H (FIGURE 3) which will be explained later, is opened through the key contact $T2a$; in particular a current circuit

(13)    —, $T2c$, O, $Wi55$, + for the relay O (FIGURE 7) is closed. This relay serves for the artificial extension of the effect of the pressure on the key T2. Its release is delayed by means of the combination of a capacitor $Co2$ and a resistor $Wi54$. It holds on at first through ($13a$)    —, $p1$, $o1$, O, $Wi55$, +

The relay P (FIGURE 7), the release of which is also delayed by means of a capacitor $Co3$ and a resistor $W57$, is controllable through the relay F (FIGURE 3) and therefore indirectly through the contact $uk$ the operation of which represents a criterion for the working of the punched tape transmitter. The relay O (FIGURE 7) holds on in any case until the shaft of the punched tape transmitter LS has run into the starting position. This corresponds therefore to an operation of the stop key until the punched tape transmitter LS has actually stopped. On excitation of the relay O a contact $o3$ is also closed and a voltage is consequently applied to the relay A.

The relay O ensures that an error does not arise if the key T2 is depressed for too short a time. After release of the key T2 the transmitter makes another step in which the current circuit (2) causes the pulse relay C (FIGURE 3) to respond and it switches itself off again through the current circuit ($2a$) by the response of the D relay and thus delivers a trigger pulse to the magnet AM.

Since the relay A (FIGURE 2) is still excited a pulse is delivered to the magnet AMS (FIGURE 7) after the magnet AM (FIGURE 3) is excited by circuit (1) and subsequently contact $uk$ is closed and the relay E thus excited. In this way the step group which was last scanned is transmitted. The magnet AM cannot however be released again through the contact $zk2$ because of the above mentioned operation of the relay A through the contact $a3$. In this manner it is possible by depressing the stop key T2 during the stand-still period of the transmitter to make available the individual transmission of step groups.

In the manner usual for simple punched tape transmitters it is also possible to cause an automatic switching-off of the arrangement by means of the above mentioned paper contact PK when the tape breaks or comes to the end. This contact is in parallel with the working contact $o3$ of the relay O (FIGURE 7). When it closes the relay A (FIGURE 2) is also energized and the punched tape transmitter LS is caused to stand-still. With this manner of working, it is also possible to exclude the teleprinter machine FS which is situated near the control device and close to the operating desk for the whole plant. By this means, if necessary, keyboard-transmitted message portions may be inserted and the teleprinter machine usually co-types, all text portions on the reception of certain text portions which are predetermined by means of a special characteristic or of functions such as carriage return. This is done by means of the contacts $qq1$ to $vv1$ (FIGURE 2) which are controlled by relays QQ to VV. When they are operated an additional relay R (Winding R1—FIGURE 2) is excited in addition to the relay J (FIGURE 2) through the circuit:

(14)    —, $qq1$ ... $vv1$, R1, $Wi75$, +

This relay is held on through the circuit:

(15)    —, $m4$, $r1$, R2, $Wi76$, + (FIGURE 7)

It short-circuits through the contact $r2$ the transmission relay contact V (FIGURE 6) in the current circuit leading to the receiver of the teleprinter machine FS. In this manner it is possible, for example, to insert into one or more punched tapes punched in receiving punches, signals for carriage return and line advance which do not appear on the sheet of the teleprinter machine FS. This may serve for the purpose of arranging the address in one line in the majority of the receiving teleprinter machines for internal requirements, and when it is not applicable for that printed sheet which is obtained from the punch tape with these additional signals after a further transfer process, perhaps for use as debit note for the customer.

If a text portion is to be amended, the following method may be used within the scope of the circuit arrangements illustrated in FIGURES 2 to 7:

The punched tape is arrested by means of the key T2 or by means of the key K11 and corresponding programming by means of plugs at the contacts $aa2$. . . . In this case the current circuit for the relay H (FIGURE 3) is prepared after excitation of the relay A through the current circuit (12b)   —, K11b, aa2 . . . , A, Wi47, + or (12c)   —, o3, A, Wi47, +

Through the contact $a2$ a current circuit for a signal lamp L3 (FIGURE 7) on the teleprinter machine is closed. This informs the operator of the teleprinter machine that the installation is ready for typing. The lamp L3 extinguishes automatically through the opening of contact $h1$ after the first signal has been keyed in.

If the desire for changing the portion of the text on the punched tape lying in the punched tape transmitter is expressed by operating the key K11 this operation is indicated by the lighting of a warning lamp L4 (FIGURE 7) on the operating desk. This lamp extinguishes again only if either the operation of the key K11 has been reversed or the relay K de-energized since the circuit for the lamp L4 is passed through the working contacts K3 and K11a. If a new text is now inserted through the keyboard of the teleprinter machine FS the relay H (FIGURE 3) can respond to give the starting step of the first signal of this text through the blocking side of the transmission relay contact I.

This occurs through

(16)   —, K1K2, H, T2a, T6e, a4, o2, Wi72, blocking side of transmission relay contact I, Wi73, +

The relay H holds on through (16a)   —, K1K2, H, T2a, T6e, h2, g4, Wi74, +

When the new text has been transmitted it is only necessary to press the key T1. Thereby the relay C (FIGURE 2) is energised through the current circuit (2) and the punched tape transmitter LS can run again. However the teleprinter signals stored in its punched tape cannot be transmitted since the transmission relays receive continuous current through the circuit:

(4b)   —, g5, h3, g3, transmission contact of the teleprinter machine FS, work winding of relay 6, g1, Gr33, work winding of relays 1 to 5, Wi59, Wi108, +

This lasts until the next combination "32" is scanned. As already explained the relay G is then excited through current circuit 10 (FIGURE 3) and the transmission relays are re-connected to the punched tape transmitter, by interrupting the current circuit 16a through the contact $g4$ and exciting the relay H. Thus the punched tape lying in the punch-all AL receives the amended text portion, with gaps, and can replace the punched tape used previously in this transmitter thus permitting a later repetition after insertion into the punched tape transmitter LS.

If it is subsequently decided not to replace a text portion after the punched tape transmitted has come to a stand-still, it is not necessary to again transmit the original text through the keyboard of the teleprinter machine but it is sufficient to depress the key T1; the punched tape transmitter then transmits the original punched text.

Figure 9:
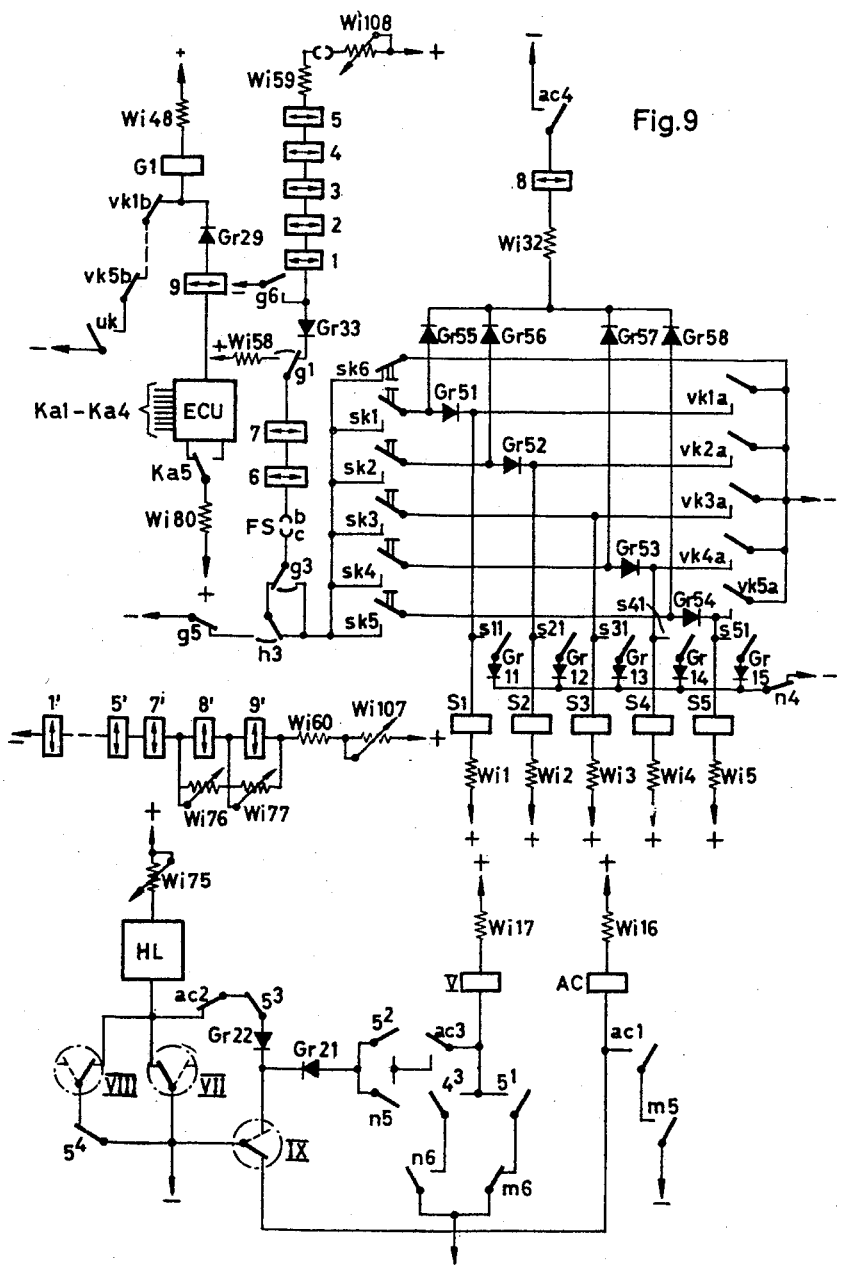
FIGURE 9 is a further circuit diagram and relates to FIGURES 2 to 7.

If desired, the circuit arrangement shown in FIGURES 2 to 7 may be modified in the manner shown in FIGURE 9. Such a modification permits the changing of the combination "32" into the combination "Zi" (transformation of numerals) and also the supplying, in addition to the subsequent message portion of this combination and the second portion of the programme routing characteristic, that is preferably, the step combination corresponding to the letter F, G or H into a special punch HL (FIGURE 9). The punched tape obtained from this punch may, for example, be used for the control of punched cards in any pre-arranged form by using those punch combinations for the control of any functions which, for example, follow the above named programme characteristic. Thus the first teleprinter signal may cause the controlled punched card to jump into a certain column, the next signal may give a command for duplicating the punched card and similar other operations.

The punched tape transmitter LS is therefore provided with a pre-scanning device which influences contacts $Ka1$ to $Ka5$ (FIGURE 9), which in turn control a rectifier code converter ECU. Further additional rectifiers 51 to 58 are to be arranged in the punched tape transmitter LS. If the punched tape transmitter is in operation and the combination "32" again occurs the relay G is excited in the manner previously explained. The combination "32" is thereby not fed to the relays 1 to 5 but to the relay 6 and an additional relay 7. The line current for the special punch HL is interrupted during the starting step through the signal side of the contact VII (FIGURE 9) controlled by relay 7 and, by means of this contact, it remains interrupted for the duration of the signal sequence. An additional relay 9 is excited together with a relay G through a rectifier Gr29 and resistor Wi80 by the fact that the code converter ECU is switched to "pass" simultaneously with the scanning of the next punch combination by means of the contacts $Ka1$ to $Ka5$ (FIGURE 9) when the pre-scanning device associated with these contacts finds punch combinations which corresponds to one of the letters F, G or H. When the contact IX corresponding to relay 9 is switched to the signal side a further relay AC is excited. A current step then arrives at the punch HL through the contact VIII during the first and second telegraphy step as the telegraphy relay 8 is supplied with current through the circuit:

(17)

—, ac4, 8, Wi32, $\frac{Gr55, sk1}{Gr56, sk2}$, g3, transmission contact of the teleprinter machine FS, 6, 7, g1, Wi58, +

The third telegraphy step becomes a space step since the telegraphy relay 8 is not connected to the third transmission contact and its contact therefore opens. In contrast, the fourth and fifth telegraph steps are inserted again in the manner corresponding to the first and second steps in the form of current steps through rectifiers Gr57, contact $sk4$ or through Gr58, $sk5$ respectively. After this signal is finished which has therefore resulted in the combination Zi in the punch HL, the relay 9 releases again since the current circuit is opened in the region of the contact $vk1b$ to $vk5b$. The further relay V (FIGURE 9) can respond through the circuit:

(18)   —, blocking side of the contact IX, Gr21, n5, ac3, V, Wi17, + after the signal Zi had been completely transmitted.

Since the relay V must respond only after transmission of the combination Zi the working contact $ac3$ controlled by the relay AC lies in the current circuit (18). The relay AC therefore controls by means of this contact the relay V so that it can respond only in a transformation process such as just described and only after the combination Zi has been transmitted. If then the relay V is energised, the relay AC is again released; this occurs in the course of the transmission of the second step of the routing characteristic, for example, of the combination corresponding to the letter B by the de-energisation of the relay M and the corresponding opening of the contact $m5$. When the relay M is released the contact $m6$ is closed and a hold-on circuit for the relay V is established through $m6$ and the working contact $5'$ is controlled by the relay V. The relay V limits, by way of the rest contacts $5^3$ and $5^4$, the operation so that only the relay 7 with contact VII can form the following signal in the punch HL and that an incorrect signal cannot be produced by the contacts VIII and IX through a possible superimposition. The contact $5^2$ also serves for maintaining the excitation of relay V through rectifier $Gr$ and one or more transmitting relays 100 in a manner similar to the arrangement illustrated in FIGURE 3.

The working time of the connected receiving sets is always smaller than the sending machine, the utilisation of the remote machines is therefore small. If one assumes that for internal controls, for example, orders to the stores department over a distance of several miles, tape receivers are satisfactory, the data distribution plant can also be disposed so that type-picture printers, e.g. Hell tape printers can be connected in circuit. The possibility then exists of employing a pure type-picture teleprinter operation or of using the teleprinter machine at the sending end and of employing hellschreiber machines at the remote places. In order to be able to employ the teleprinter-hellschreiber combination, a converter for all hellschreibers to be connected from the five unit code to hell signals is required and, beyond this, adaptation to the writing velocities of the teleprinter machines has to be carried out. Finally the data distribution plant may also be designed for mixed operation on the output side.

Let it be assumed in the arrangement illustrated in FIGURES 11 to 14 that the plant is controlled by a teleprinter machine of the conventional type. FIGURE 11 shows that in this case the arrangement of a contact $fs$ in the exciter circuit of a relay SU ensures that this relay is excited when any key of this teleprinter machine with the exception of the key "here is" is operated. A working contact $su1$ controllable by the relay SU lies, as may be seen from FIGURE 13, in parallel with the contact $p3$ illustrated in FIGURE 3 in the excitation current circuit of the release magnet AM of the programme punched tape transmitter. In series with the parallel circuit of the contact $p3$ and $su1$ lies a rest contact $sz2$ which is controlled by a relay SZ which is discussed later. A rest contact $su2$ in the current circuit of the relay D ensures the de-energisation of relay D. By closing a rest contact $d1$ together with a working contact $su3$ in the current circuit of a further relay SV (FIGURE 11) this relay is excited. Thereupon the relay C responds through contact $sv1$ and $d2$ and delivers a pulse to the release magnet AM of the scanning device for the programme punched tape through the circuit:

—, T$3a$, $k6$, $c2$, $sz2$, $su1$, AM, W$i61$, +

In contrast the magnet AMS (FIGURE 11) of the transfer transmission distributor for the information content of this tape cannot receive a pulse over the relay E since the contact $su4$ in the operating current circuit of this magnet is open. The programme punched tape is thus transported further but its information is not transmitted.

If a characteristic combination arrives at the scanning device, for example the teleprinter combination No. 32, an additional relay SY can respond by means of the pre-scanning contact $ka1$ to $ka5$ through the circuit:

The relay SY holds on subsequently through the working contact $sy1$ and the rest contact $sz3$. A working contact $sy2$ prepares the current circuit of a further relay SZ (winding SZ1) which responds when the relay SU releases. The relay SZ holds on through its own working contact $sz1$, the contact T$1b$ of the starter key T1 and the winding SZ2. Thus the transmitter SFS (FIGURE 12) of the sending teleprinter machine FS is short circuited through a working contact $sz4$. Moreover the release magnet AM of the programme punched tape transmitter cannot be excited again through the relay C since the contact $sz2$ which lies in the current circuit of the release magnet AM has disconnected this current circuit. In this way the insertion inserted into a certain column of a form more than is permissible is prevented. The blockage is relieved only after depressing the starter key T1 (contact T$1b$) by the fact that the relay SZ is made to release. If a certain text portion is amended, i.e., if a new text is written into the certain passage of a form, the corresponding old text passes, as explained previously for the current circuits (16, 16a), as a programme punched tape through a so-called punch-all tape, used as an example, without being transmitted. If however the newly written text portion is shorter, the circuit arrangement described below ensures that a portion of the old text is not transmitted. As explained in connection with the current circuit (16) the relay H is excited as soon as a new text is written into the said column.

Figure 12:
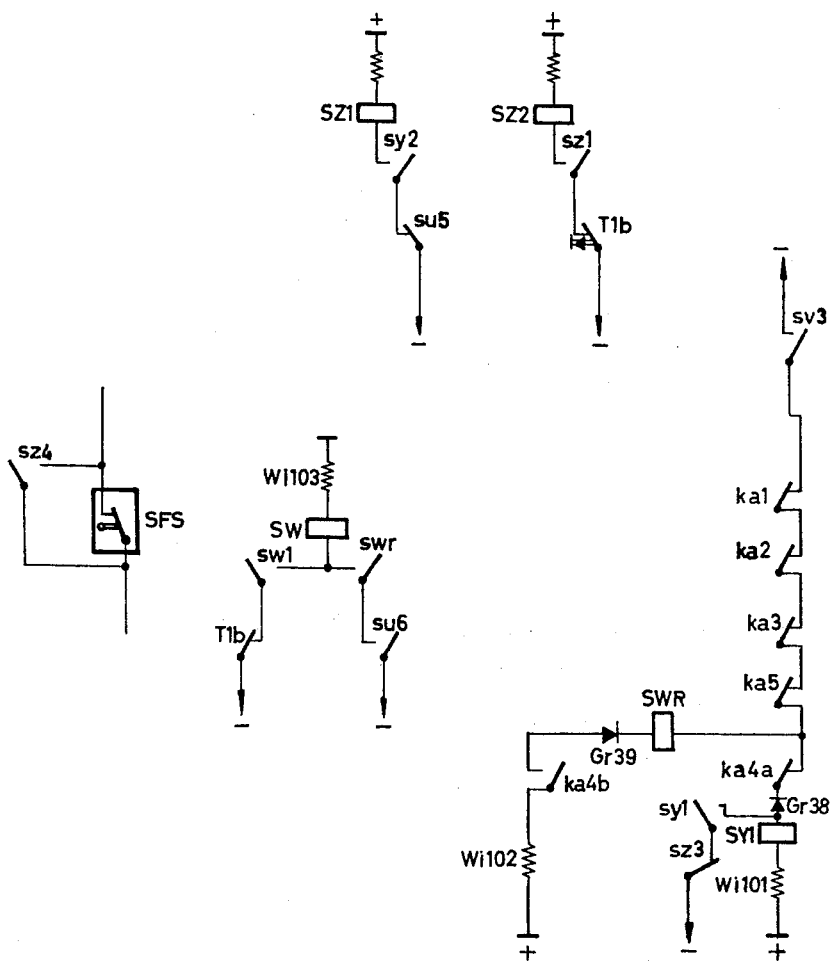
Figure 13:
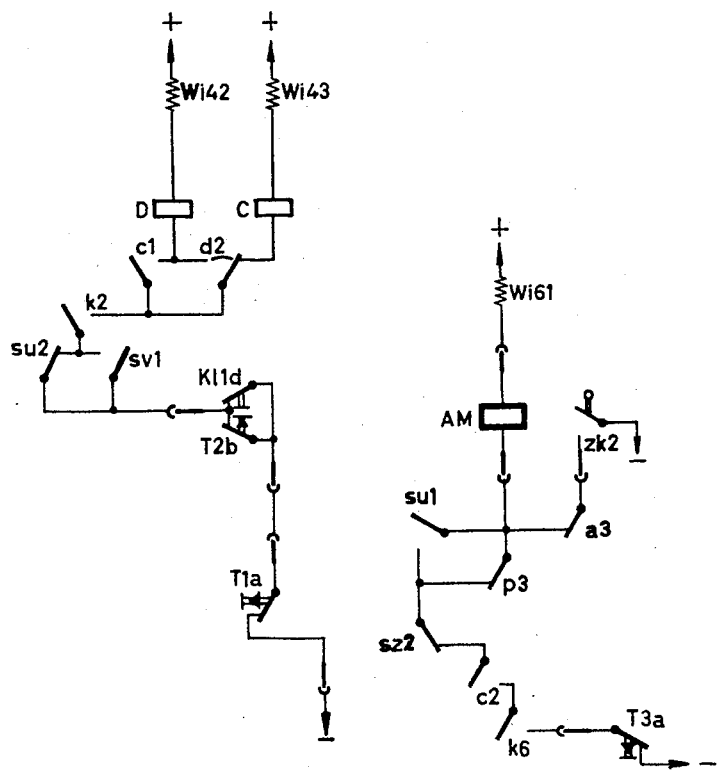

The relay H is provided with an additional contact $h4$ which lies in a special current circuit for a further relay SX. As soon as this relay is excited the lines of the preparing transmission contact $vk1a$ . . . $vk5a$ to the transmitter distributor are interrupted in the manner which becomes evident from the additional circuit arrangement FIGURE 14 through contact $sx1$ . . . $sx5$. However, a negative potential is applied to the transmitter distributor contact $sk3$ allocated to the third step by means of the contact $sx3$ which is arranged as a changeover contact. If the punched tape transmitter is again started once more the combination interval is transmitted independent of the scanned step group. The number of step groups in a punch-all step allocated to the last column of a line of a form need not necessarily (supplemented by interval) correspond to the number of the maximally insertable letter signs in contrast to the step groups allocated to other columns. The combination carriage return rather must be present in the punched tape after the teleprinter combination corresponding to the letter signs. When this combination is scanned a further relay SWR responds through +, W$i102$, $ka4b$, G$r39$, SWR, $ka5$,
$ka3$, $ka2$, $ka1$, $sv3$, — (FIGURE 12)

As soon as the relay SWR is energised a further relay SW is energised through the closed contacts $su6$ and $swr$ and this relay holds itself through the circuit:

—, T$1b$, $sw1$, SW, W$i103$, + until the programme punched tape starts again. It normally runs in synchronism with the insertion of text. A further contact $sw2$ of the relay SW is located in the current circuit of the relay SU, prevents that the relay SU, during insertion of text, from responding in the last column of a line. Thus the further movement of the punched tape is interrupted since the contact $su2$ is open. Also the combination carriage return can occur in the programme; this is not to be effective in the sending teleprinter machine but is only to serve for the control of connected receiving machines. In contrast, the last mentioned circuit arrangement is to respond only to combinations, such as carriage return, which are also required for the sending teleprinter machine. As mentioned, this is achieved by the arrangement of the relay SW which is connected through the contacts $sw1$ and $su6$.

In a data distribution plant having the explained characteristics the true transcription of the column to all receivers is ensured by the control punched tape thus con- —, $sv3$, $ka1$ . . . $ka5$, G$r38$, SY,
W$i101$, + (FIGURE 12)

structed. For a faulty operation by the operator the error only becomes effective in the respective column and is recognized at once. Otherwise the error would occur in all subsequent columns and would only become apparent under certain circumstances when the obtained punched tape conserve is re-processed. Since the faulty operation is signaled any unnecessary work which would arise due to the operating personnel carrying on writing is avoided. Further safeguards are possible when the combination carriage return, instead of interval, is punched into the control punched tape for the normally-occurring step groups. This carriage return can become effective with faulty operation whereby the normal control programme is interfered with and sensible writing is no longer possible.

Moreover in the data distribution plant a punched tape can be obtained containing information in a rigidly fixed sequence only. Such an information punched tape may be kept as a punched tape reserve and may be used at any time together with the corresponding programme punched tape for the automatic transcription in the data distribution plant. This results in the advantage that all control functions lie only in the programme punched tape and not in said information punched tape.

Figure 16:
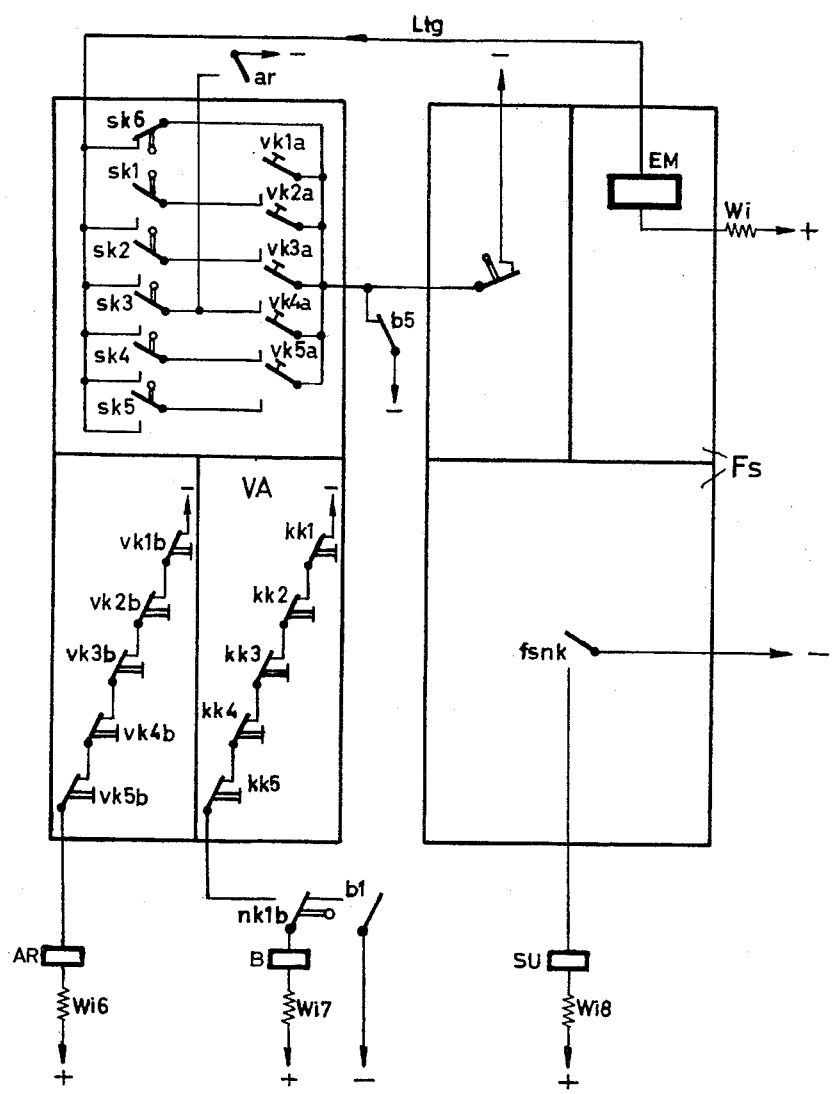
Figure 17:
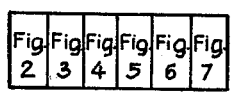
FIGURE 17 illustrates the interconnection of the circuits illustrated in FIGURES 2 to 7.

The safeguarding device for writing-in, for example, into limited columns of a sheet teleprinter according to FIGURES 15 and 16 works as follows: Let it be assumed that a punched tape lies in the controlling punched tape transmitter which contains only punch combinations for functions such as carriage return, line advance and interval and also routing combinations No. 32.

Figure 4:
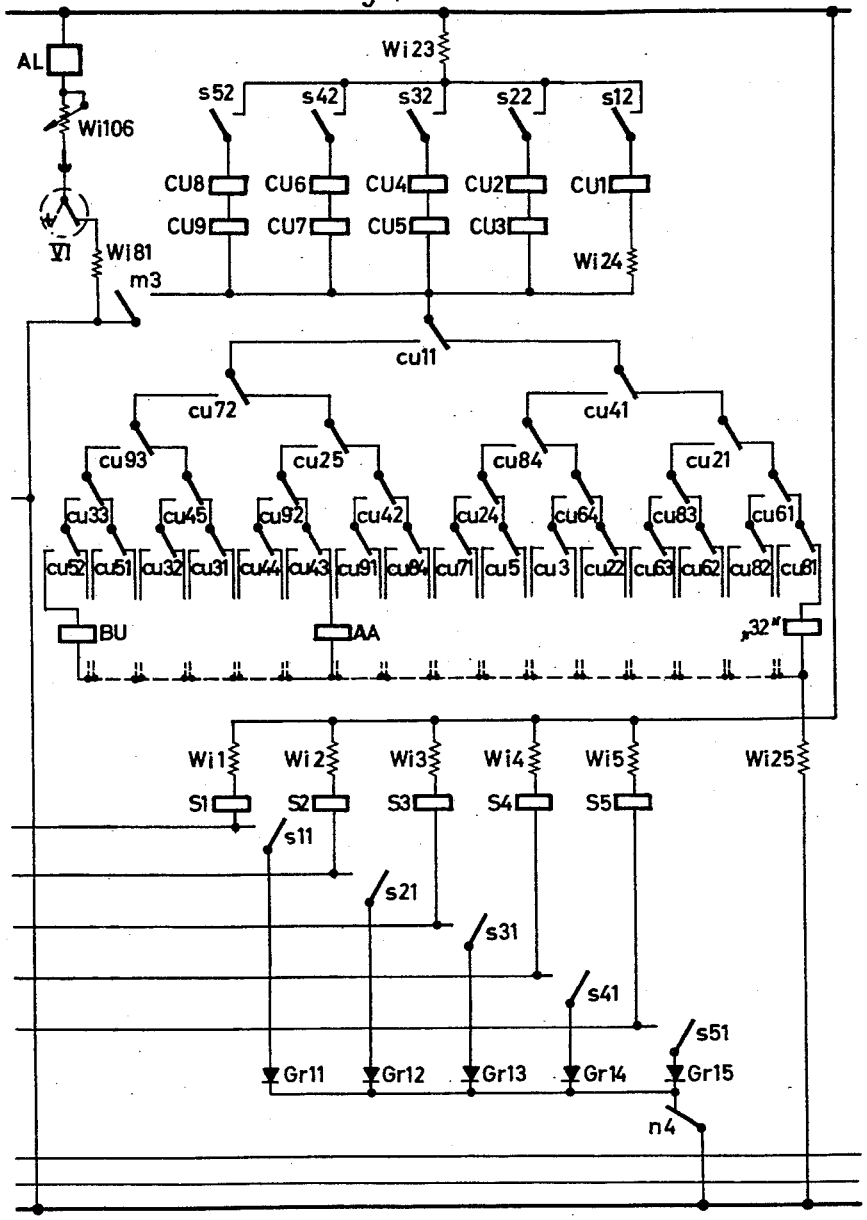
Figure 5:
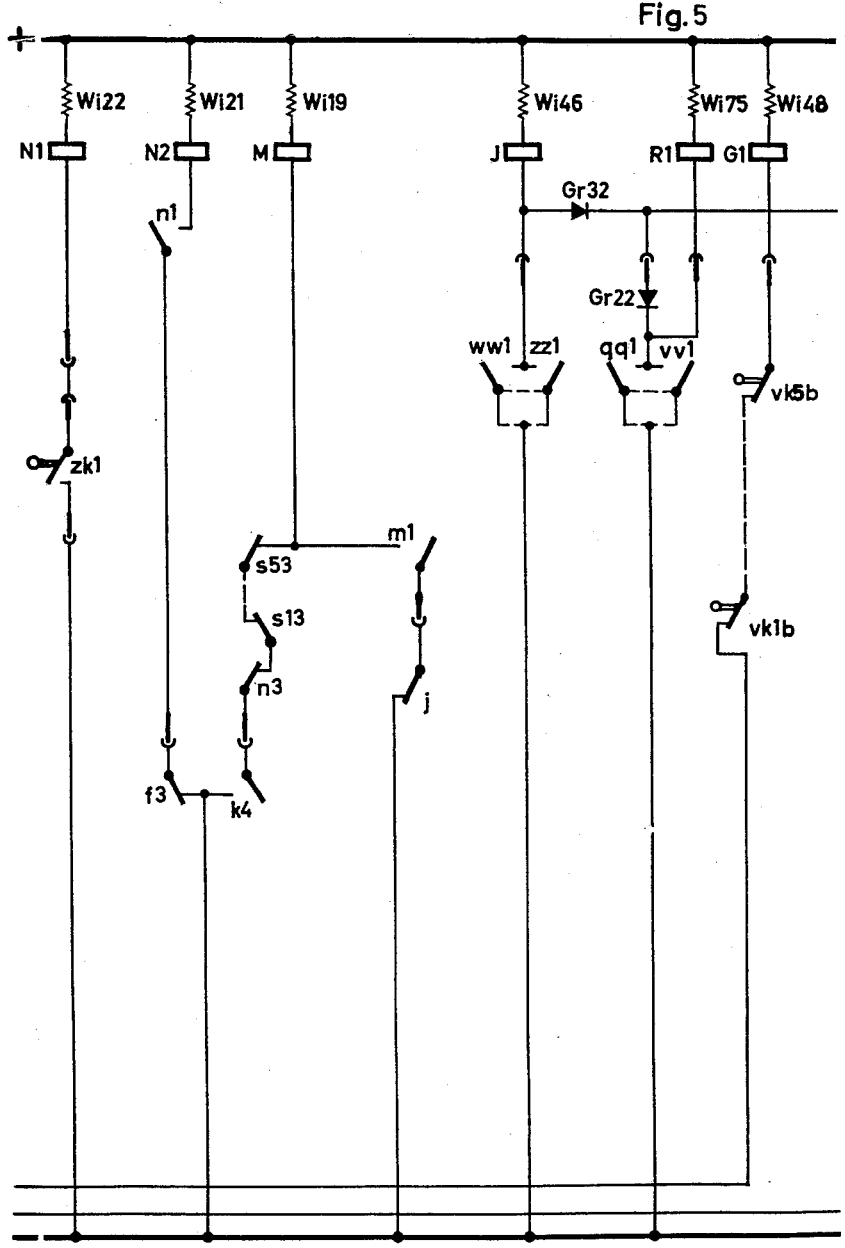
Figure 6:
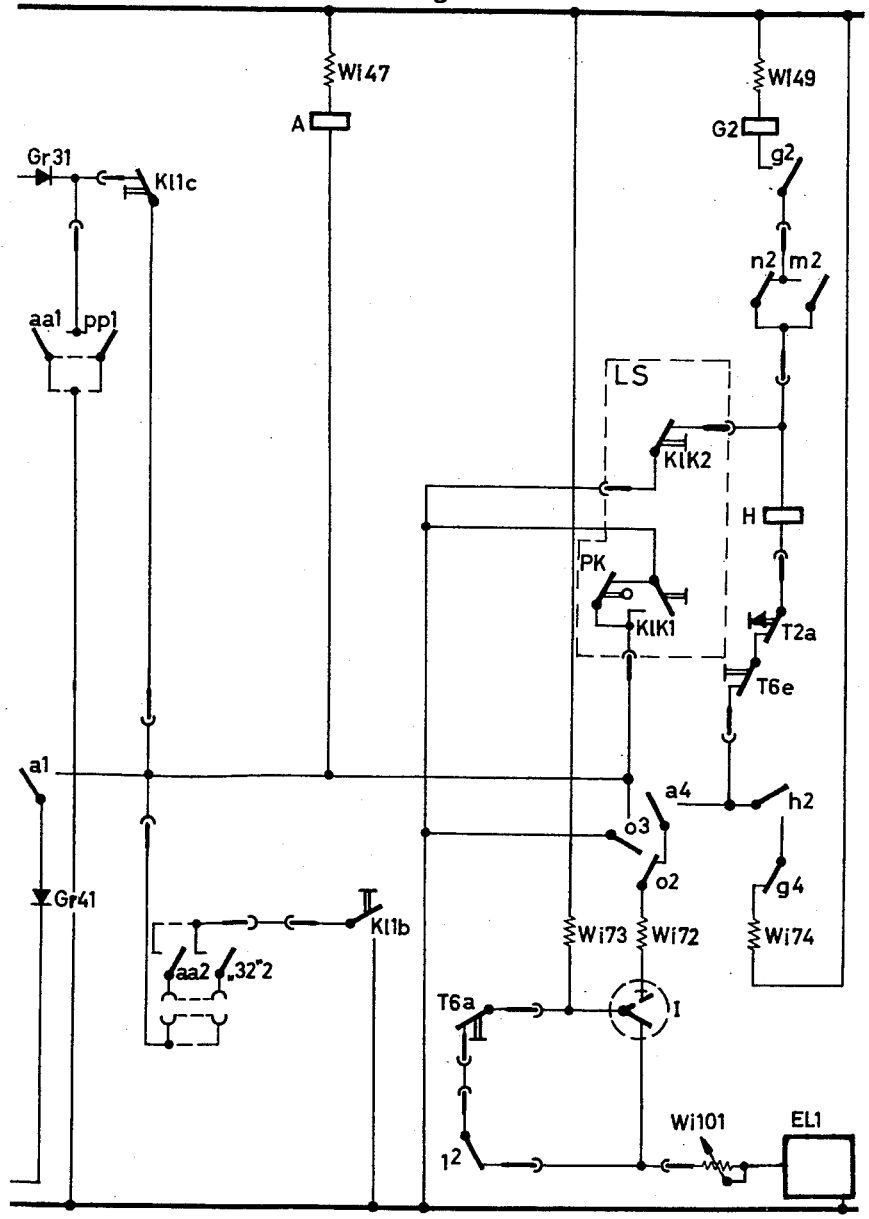

Similarly to the arrangement illustrated in FIGURES 2 to 4 the plant is adapted to be switched in by means of a key T1 which is in reality multipolar and when depressed energises a self-holding relay K which is not illustrated. A contact $k2$ in the current circuit of the relays C and D is therefore closed and in the following manner at first the relay C and then the relay D are energised, the relay C then being de-energised. The relay C is excited through the circuit:

—, T1, $k2$, $d1$, C, W$i$43, +

In the following description a resistor is always denoted with W$i$ and a number, for example W$i$43. The relay C causes the relay D to energise through its current circuit:

$c2$, D, W$i$42 to +

The relay D holds on through the changeover contact $d1$, the relay C de-energising simultaneously. The relay C delivers therefore always a short pulse for corresponding switching functions. In order to avoid the possibility that a pulse reaching the release magnet AM when the plant is switched on, the blocking means discussed in more detail with reference to FIGURES 2 to 7 are used.

In order to make the switching means and the programme punched tape transmitter operative the start key T1 is depressed. Therefore the relay D is energised through the rest contact T1 lying in the above mentioned current circuit for the relay D. The current circuit for the relay C is again prepared by the contact $d1$. After release of the key T1 this relay attracts its armature and closes the current circuit which was previously prepared by the contact $k2$. Since however the current circuit for the relay D is closed through the contact $c2$ and the relay C is simultaneously de-energized again through the contact $d1$, only one current pulse is supplied to the release magnet AM. Sensing levers in the punched tape transmitter scan the inserted punched tape and close, for example when the punched combination interval is present, the contact $vk3a$ of the contacts $vk1a$ to $vk5a$ in the punched tape transmitter.

The release magnet AM of the controlling punched tape transmitter is energised through the circuit:

—, $f2$, $c1$, AM, W$i$1, +

A cam contact $nk1a$ is provided on the sensing head of the controlling transmitter and this contact triggers off the magnet AMS of the transfer transmitter distributor of the controlling punched tape transmitter. In this case the current flows through a rest contact $su2$ which is to be explained below in more detail. The transfer transmitter distributor contains the contacts $sk1$ to $sk6$ which are successively controllable. The cam contact $nk2$ is also located on the transfer transmitter distributor shaft and makes the release magnet AM operative again through the circuit:

—, $nk2$, $b4$, AM, W$i$1, +

This interaction is repeated until the combination No. 32 is detected by the pre-scanning device VA of the controlling punched tape transmitter and is evaluated so that a relay B is energised through five rest contacts $kk1b$ to $kk5b$ connected in series and a cam contact $nk1b$ which is operated simultaneously with the cam contact $nk1a$. This relay holds on through the rest side of the switch-over contact $nk1b$ and the contact $b1$. A further contact $b4$ controlled by relay B interrupts now the interaction, just described, of the release magnets AM and AMS; the punched tape transmitter is not stopped. The apparatus is now ready to receive information from the transmitting keyboard teleprinter machine. If now a number of keys of this machine are operated, relay SU responds for each key depression in the manner explained in the preceding example through the circuit:

—, $fsnk$, SU, W$i$8, +

The contact $fsnk$ is a cam contact which is located on the sending machine F$s$ and is kept closed during the transmission of a signal. The rest contact $su2$ is opened by the energisation of the relay SU and in this manner the release of the transfer transmission distributor by the magnet AMS is prevented. The number of letter signs to be inscribed into the present column is determined by the number of the step group combinations No. 32 provided in the controlling punched tape. These excite the relay B through said pre-scanning contacts $vk1b$ to $vk5b$. Thus only when writing takes place on the sending teleprinter machine F$s$ is the advance of the controlling punched tape triggered off through the circuit:

—, $b3$, $su1$, AM, W$i$1, + and the hole combinations of this tape scanned. As soon as the operator tries to key in more letter signs than was intended their insertion is prevented in the following manner: After the last combination No. 32 has left the pre-scanning device the relay B cannot hold-on any more when the contact $nk1b$ closes again. It therefore de-energises. Thus the above-mentioned release current circuit is interrupted by the contact $b3$. Moreover, the transmission contact of the writing teleprinter machine F$s$ is bridged by the rest contact $b5$ and thus an undesirable output from this machine is prevented.

If the combination No. 32 is present in the scanning device of the controlling punched tape transmitter, the relay AR is excited for a short period—provided that the operation of the transfer transmitter distributor with the contacts $sk1$ to $sk6$ is not suppressed, in the manner just explained, by the operation of the key board of the sending teleprinter machine and the non-energisation of the magnet AMS. The energisation of relay AR is carried into effect through further preparing transmitter rest contacts $vk1b$ to $vk5b$, which are connected in series. The contact $ar$ of the energised relay AR supplies negative potential to the transfer transmitter contact $sk3$; in this way the step group interval is produced on the line L$tg$ leading to the receiver EM. This is continued for as long as step group combinations No. 32 are scanned in the controlling punched tape and they follow each other directly. At least one combination interval is inserted between two series each of combinations No. 32 in order to ensure a certain distance between the letter signs in two columns. The insertion of the step group interval or of another step group apart from the combination No. 32, and the first combination No. 32 allocated to the next column, serves moreover for stopping the controlling punched tape and for safely ensuring the renewed writing-in into the next column, after the automatic insertion of the interval in gaps at the end of the preceding column.

If, for example, instead of 10 possible signs only 5 signs are written in, when the transmitter is again started it would stop a further 5 times before carrying on automatically. This is because the relay B can hold on a further 5 times through the contact $nk1b$ when the combination No. 32 occurs and therefore the contact $b4$ opens the release current circuit of the magnet AM. In order to ensure that in this case a passage exists through the transmitter in spite of the pre-scanning of further CCIT combinations No. 32 a contact $e1$ is connected in parallel with the contact $b4$. If a start is now made and the relay B is still energised, the further relay E can respond through the circuit:

$$-, T1, b2, E, Wi5, +$$

If, however, the number of letter signs to be written is to be controlled the transmitter can be started only when sufficient signs are keyed-in. For these control purposes the key $Kl$ is depressed. Therefore, when starting is intended, a relay F can respond through the current circuit:

$$-, Kl, T1, b6, F, Wi9, +$$

If the combination No. 32 is still present in the pre-scanning device and therefore the contact $b6$ is closed, when the starting key T1 is depressed and when this circuit is selected the pulse cannot energise, the release magnet AM through the contact $c1$ because the rest contact $f2$ is open and the magnet is connected in series with this contact. If, by means of an alarm device, an indication is required when too little is entered into a column, the arrangement may be elaborated by arranging that an alarm device $Al$ is adapted to be triggered through the contact $f1$.

What we claim as our invention and desire to secure by Letter Patent of the United States is:

1. Information-routing apparatus including a plurality of teleprinter receiving devices, control means, means for supplying teleprinter information and at least one routing teleprinter signal to said control means, and means for allocating said routing signal to a selected number of receiving devices, said control means being responsive to said routing signal to cause a portion of said information following said routing signal to be routed to the selected number of said receiving devices to which that routing signal is allocated.

2. Information-routing apparatus including a plurality of teleprinter receiving devices, control means, means for supplying teleprinter information and a number of routing teleprinter signals to said control means, each one of said routing signals being associated with a separate portion of the information, and means for allocating each routing signal to a respective selected number of said receiving devices, said control means being responsive to each routing signal to route the portion of said information with which that routing signal is associated to the respective selected number of receiving devices to which that routing signal has been allocated.

3. Apparatus according to claim 1, including suppression means to prevent said routing signal being passed to said receiving devices.

4. Apparatus according to claim 1, including means for translating said routing signal into a control signal suitable for the type of receiving device to which it is allocated.

5. Information-routing apparatus comprising a key-controlled teleprinter machine, a teleprinter punched tape reader, control means, a receiver punch machine capable of punching information messages and routing signals into a tape, a plurality of teleprinter receiving devices, and means for passing messages from said teleprinter machine together with routing signals to said control means, said control means being responsive to each routing signal to route associated information to a selected number of said receiving devices.

6. Information-routing apparatus including a key operated teleprinter device, a plurality of teleprinter receiving devices, a teleprinter punch tape reader for reading a punched tape containing information and routing signals, control means, means for allocating each routing signal to a selected number of said receiving devices, and a manually-operable switch means operable to stop said punched tape reader after the occurrence of a routing signal by means of a control relay with a relay control contact to permit the substitution of alternative information by means of said key-operated device.

7. Information-routing apparatus including a key-controlled form teleprinter machine, a routing signal punched tape reader, blocking switching means for permitting teleprinter signs to be keyed between the routing characteristics and to be allocated to letter signs, means controlled by said blocking switching means for transporting the program punched tape forward in steps when teleprinter signals are keyed-in through said teleprinter machine keyboard, and means controlled by said blocking switching means for stopping the transmission of teleprinter signals keyed-in through said keyboard when the next program routing characteristic is detected.

8. Information-routing apparatus according to claim 6, wherein said manually-operable switch means includes a re-adjustable switch associated with a plurality of bridging contact, each bridging contact being associated with a respective routing signal and being manually operable to prepare the control current circuit of a relay so that the circuit is completed when a respective routing signal is detected.

9. Information-routing apparatus according to claim 2, including a plug and jack arrangement for the allocation of each routing signal to the respective selected number of receiving devices.

10. Information-routing apparatus as claimed in claim 7, including a further reading device, wherein said blocking switch means is effective when a combination including number 32 occurs and is detected by said second scanning device.

11. Information-routing apparatus as claimed in claim 10 including switching means to ensure that when the teleprinter combination corresponding to "carriage return" is detected in the programme punched tape the remainder of a column on a form in any of said receiving devices is not filled in.

12. Apparatus according to claim 1, wherein the control means comprises a switching device including a relay having an operating coil which is connected in series with a number of contacts each one connected in series with each other, said contacts corresponding in number to the number of information bits in the telegraphic code used, means for operating each of said contacts to be opened or closed in accordance with the presence or absence respectively of an associated telegraphic signal, means for detecting a pre-determined routing signal, at least one current device controlled by said relay and responsive to said detecting means to suppress the transmission of information to said teleprinter receiver devices, said suppression being for the duration of said pre-determined routing signal and the next succeeding signal, a pre-adjustable selector distributor device including a code converter, means for applying the signal following said routing signal to said code converter of said pre-adjustable selector distributor device, a plurality of transmitting relays each associated with a separate receiver device and connected to a common transmitter distributor, means for operating a selected number of said relays in response to a selected teleprinter combination, and switching means for rendering inoperable said transmitting relays when the next pre-determined routing signal is detected.

13. Information-routing apparatus as claimed in claim 12, including means for translating said control characteristic into a teleprinter combination interval and further means for transmitting this combination interval when teleprinter signs have not been transmitted by the keyboard teleprinter in order to avoid gaps in the columns.

14. Information-routing apparatus as claimed in claim 13 including an alarm device connected to said further means so that it is triggered off when said further means is transmitting.

15. Information-routing apparatus including a key-controlled form teleprinter machine, a program punched tape transmitter, an automatic switching device for connecting the teleprinter machine and the punched tape transmitter alternatively to a teleprinter line, wherein the program punched tape transmitter is provided with a pre-scanning device and a main-scanning device and the program punched tape is constructed as a control-punched tape for supervising the number of the letter signs to be written into a column on a form by the arrangement of a predetermined constant control characteristic for each letter sign, wherein the apparatus also includes blocking switching means, means controlled by said blocking switching means for transporting the program punched tape forward in steps when teleprinter signs are keyed-in through the teleprinter keyboard, means for stopping the transmission of teleprinter signs keyed-in through this keyboard when any teleprinter sign other than the said control characteristic is detected in the program punched tape, and means for causing the transmission, between two columns, of at least one other teleprinter sign provided in the program punched tape.

References Cited in the file of this patent
UNITED STATES PATENTS

| | | |
|---|---|---|
| 2,738,376 | Vernam et al. | Mar. 13, 1956 |
| 2,852,760 | Eckhardt | Sept. 16, 1958 |
| 2,912,483 | Andres | Nov. 10, 1959 |
| 2,978,534 | Crowson et al. | Apr. 14, 1961 |
| 3,001,010 | Mahoney et al. | Sept. 19, 1961 |